United States Patent [19]

Formica et al.

[11] 4,298,399
[45] Nov. 3, 1981

[54] PROCESS FOR SALT GRINDING OF PIGMENTS

[75] Inventors: Francis A. Formica, Tinton Falls; James B. Izenberg, Metuchen, both of N.J.

[73] Assignee: International Pigment Processing Corp., Paterson, N.J.

[21] Appl. No.: 158,615

[22] Filed: Jun. 11, 1980

[51] Int. Cl.$^3$ .............................................. B02C 23/18
[52] U.S. Cl. ............................... 106/309; 106/288 Q; 241/15; 241/16; 241/22; 260/314.5
[58] Field of Search ............... 106/309, 288 Q, 308 C, 106/217; 241/15, 16, 22; 260/314.5

[56] References Cited

U.S. PATENT DOCUMENTS

| | | | |
|---|---|---|---|
| 2,155,326 | 4/1939 | O'Brien | 106/308 C |
| 2,259,457 | 12/1941 | Croll | 241/16 X |
| 2,402,167 | 6/1946 | Lane et al. | 260/314.5 |
| 2,982,666 | 5/1961 | Chun et al. | 106/309 X |
| 4,196,016 | 4/1980 | Simon | 106/309 |

FOREIGN PATENT DOCUMENTS 569402  5/1945  United Kingdom .................. 241/22

OTHER PUBLICATIONS

Morrison, R. T. et al., Organic Chemistry (1966), 2nd ed., pp. 982–983, 1019, 1025, 1027.

Primary Examiner—Helen M. McCarthy
Attorney, Agent, or Firm—Samuelson & Jacob

[57] ABSTRACT

A salt grinding process for comminuting crude pigments in which corn syrup, corn syrup solids or molasses are added to a blend of crude pigment and salt to permit the process to be carried out in a continuous process as well as in a batch process with less expended energy and less salt than when the corn syrup or molasses is not present.

7 Claims, No Drawings

PROCESS FOR SALT GRINDING OF PIGMENTS

This invention relates to the grinding of pigments using a minimum of energy and a minimum amount of grinding aids. The resulting pigments possess colors which are clean and strong and compare more than favorably with current commercially available ground pigments.

The properties of pigments depend in part on the fineness of the particles and on their shape and the art of comminuting pigments is highly developed as may be seen from the following patents which are considered representative of the art to which the present invention pertains:

Lang et al: U.S. Pat. No. 2,402,167 issued June 18, 1946
Graham: U.S. Pat. No. 2,556,728 issued June 12, 1951
Ehrich et al: U.S. Pat. No. 2,816,114 issued Dec. 10, 1957
Huband et al: U.S. Pat. No. 3,176,925 issued Apr. 6, 1965
Lucchini et al: U.S. Pat No. 3,313,491 issued Apr. 11, 1967
Akamatsu et al: U.S. Pat. No. 3,748,164 issued July 24, 1973
Steel et al: U.S. Pat. No. 3,950,182 issued Apr. 13, 1976 (Reissued as U.S. Pat. No. Re. 29,295)

As described, for example, in Ehrich U.S. Pat. No. 2,816,114, at least three distinct methods are recognized, namely: (1) acid pasting; (2) salt milling; and (3) solvent milling.

Later developments of the salt milling technique include the addition of tackifying agents to improve the process, e.g. as described in Akamatsu et al U.S. Pat. No. 3,748,164 and elsewhere in the patent literature.

The present invention is addressed to an improved salt milling or salt grinding process wherein a viscous material such as corn syrup, corn syrup solids or molasses with or without the addition of either water or a glycol or both as viscosity modifying agents is added to the salt and pigment whereby the proportion of salt relative to the amount of pigment may be considerably diminished and the process may be carried out more expeditiously.

One object of the invention is to provide a process for the manufacture of a suitable pigment for the coloration of inks for paper and textile printing, for the coloration of plastic, fibers, paints, paper, etc., by grinding crude pigment crystals, using a water soluble inorganic salt as the grinding media and a viscous material such as corn syrup, corn syrup solids or molasses, as the grinding aid, the viscosity of these being modified if desired with either water, a glycol or a polyglycol.

Another object of the invention is to produce pigments with excellent color values by a salt grinding process using a less than normal quantity of the salt and using much less energy than the conventional methods now being practiced.

A further object of the invention is to carry out the salt grinding process in a continuous mixer instead of the double arm mixer which has been utilized in the past as described in U.S. Pat. No. 3,748,164 and other patents, whereby a more uniform product may be produced in large quantities over extended time intervals with less energy consumption than is required by standard double arm mixers.

The salt used in the salt milling process of the present invention may be any of a number of inorganic salts including soldium chloride, sodium sulfate, sodium carbonate, and any of the other water soluble salts noted for example in U.S. Pat. No. 3,176,925, the disclosure of which is incorporated by this reference. Because it is readily available and is inexpensive, the preferred grinding agent in NaCl. The proportions of salt to pigment may be as high as 20:1 and as low as 3:1 or even lower but since the salt must be washed out of the pigment product, proportions between about 4:1 and 6:1 are preferred to higher ones.

The conditioning agents which have been added to permit the use of smaller proportions of the salt used as a grinding aid include: a commercially available corn syrup (Globe Three Star 1132) which consists of 80% solids, 20% water; corn syrup solids (A. F. Staley, dry corn syrup solids 42R) which consists of 96% solids; and ordinary commercially available molasses. The conditioning agents may be modified with water and/or a glycol, such as ethylene glycol or propylene glycol, or a polyglycol to produce a desired viscosity.

The proportion of conditioning agent may be between about ½ and 4 pounds per pound of pigment, a preferred range being between about 1 and 2 pounds per pound of pigment being processed.

The pigment was recovered from the charge in the mixer by dumping the contents of the mixer into a container and washing with water, while stirring, so that the salt and conditioning agent were dissolved. The mixture was filtered and the pigment was collected on the filter.

The present invention possesses a number of advantages over the prior art salt milling processes known to Applicant, including the following:

1. smaller proportions of salt may be used, thereby requiring less water to remove the salt from the pigment product;

2. smaller amounts of energy are required than when salt grinding without the conditioning agent and the grinding may be accomplished in a shorter time interval;

3. the process may be run as either a batch process or as a continuous process whereby a more uniform product is obtainable;

4. no toxic solvents or other chemicals are added to the pigment to be ground;

5. both of the additives, salt and conditioning agent are readily available as commercial products and relatively inexpensive.

The invention will be further understood from the Examples which follow which are intended to illustrate preferred embodiments of the invention and are not intended to limit the same.

EXAMPLE I

Into a heavy duty laboratory double arm mixer with a capacity of 1 liter, driven by a 1 H.P. motor, the following were added in increments over a period of 15 minutes:

180 grams NaCl
60 grams crude copper phthalocyanine blue
80 grams corn syrup (Globe Three Star 1132)

The resulting mixture was ground for approximately 1.5 hours. The mixer jacket was cooled to maintain a temperature of 140°–180° F. in the mixer. The grinding mass was a firm plastic dough. When grinding was complete the mixture was removed from the mixer and the salt and the corn syrup were removed by dissolving them in 160° F. water. The pigment was filtered and washed until salt free. The filter cake had a solids content of 38% to 42% and the color was a bright green shade of blue equal or superior to brands currently on the market.

The process can be speeded up by increasing the salt to pigment ratio from 3 to 1, for example up to 6 to 1 ratio.

EXAMPLE II

Into a heavy duty laboratory double arm mixer of Example I the following were added in increments as in the preceding Example:

180 grams sodium chloride
60 grams crude copper phthalocyanine blue
60 grams corn syrup (Globe Three Star 1132)
20 grams corn syrup solids (A. F. Staley 42R)

The firmness of the resulting plastic dough was adjusted with small amounts of $H_2O$ or a glycol. After 1.5 hours the material was removed from the mixer and treated as in Example I to recover the pigment.

EXAMPLE III

Into a Baker Perkins (MP 1295) continuous mixer, turning at a speed of 70 rmp, powered by a 150 H.P. motor the following materials were fed continuously and simultaneously at the indicated rates and with a residence time of about nine minutes:

20 pounds salt (NaCl)/min.
3 pounds copper phthalocyanine blue crude/min.
4 pounds corn syrup (Globe Three Star)/min.

The jackets and paddle shaft core were cooled so that the ground mixture exiting from the machine had a temperature of 120°-140° F. The ground material was placed in a tank with sufficient water to dissolve the corn syrup and the salt. It was then pressed and washed free of salt and syrup. The resultant cake was approximately 40% solids and was of excellent quality.

Although the present invention has been described with reference to milling crude phthalocyanine blue, it has also been successfully applied to grind the crude crystals of carbazole violet, copper phthalocyanine green and flavanthrone with excellent results and can be used in connection with the grinding of other organic pigments having a crystalline structure with characteristics similar to those of the enumerated pigments.

Having described preferred embodiments of the invention, it is not intended that it be limited except as described in the appended claims.

The embodiments of the invention in which an exclusive property or privilege is claimed are defined as follows:

1. In a process in which a finely divided crystalline organic pigment is produced from a coarser crude crystalline organic pigment by grinding the coarse pigment in the presence of a water soluble inorganic salt as the grinding media and a water soluble conditioning agent as the grinding aid and thereafter separating the resulting finely divided organic pigment from said salt and said conditioning agent, wherein the proportion of inorganic salt to pigment is from about 3 and up to 20 parts by weight of salt for each part by weight or organic pigment, the improvement which comprises providing as the conditioning agent a water soluble viscous material selected from the group consisting of corn syrup, corn syrup solids and molasses and the proportion of conditioning agent to pigment is between about $\frac{1}{2}$ and 4 parts by weight of conditioning agent to each part by weight of organic pigment.

2. The process of claim 1 wherein the conditioning agent is diluted with a diluent selected from the group consisting of water, glycols, polyglycols and mixtures thereof.

3. The process of claim 1 in which the proportion of salt to pigment is between about 4 and 6 parts by weight of salt for each part by weight of pigment.

4. The process of claim in which the salt is NaCl.

5. The process of claim 1 in which the proportion of conditioning agent is between 1 and 2 parts by weight of conditioning agent to each part by weight of organic pigment.

6. The process of claim 1 wherein the organic pigment is a phthalocyanine.

7. The process of claim 1 wherein the organic pigment, salt and conditioning agent are fed continuously into a continuous mixer and the product is continuously withdrawn from said mixer.

* * * * *